United States Patent
Kar et al.

(10) Patent No.: US 7,630,147 B1
(45) Date of Patent: Dec. 8, 2009

(54) LASER BEAM SHAPING FOR PITCHFORK PROFILE

(75) Inventors: Aravinda Kar, Oviedo, FL (US); Chong Zhang, Orlando, FL (US); Nathaniel R. Quick, Lake Mary, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 122 days.

(21) Appl. No.: 11/675,819

(22) Filed: Feb. 16, 2007

(51) Int. Cl.
    *G02B 13/18* (2006.01)
(52) U.S. Cl. ...................................... 359/716; 359/708
(58) Field of Classification Search ................. 359/708, 359/713–717, 434; 219/121.7, 121.75
    See application file for complete search history.

(56) References Cited

U.S. PATENT DOCUMENTS

| | | | |
|---|---|---|---|
| 6,295,168 B1 | 9/2001 | Hoffnagle et al. | 359/708 |
| 7,355,166 B2* | 4/2008 | Sherrer et al. | 250/239 |
| 7,400,457 B1* | 7/2008 | Cayer | 359/717 |
| 2005/0069007 A1* | 3/2005 | Kennedy et al. | 372/55 |
| 2007/0140092 A1* | 6/2007 | Frangineas | 369/112.18 |
| 2007/0193987 A1* | 8/2007 | Bischoff et al. | 219/121.73 |

OTHER PUBLICATIONS

M. Arif, M. Hossain, A. Awwal, M. Islam, "Two-element refracting system for annular Gaussian-to-Bessel beam Transformation" *Applied Optics*, vol. 37, No. 19 (Jul. 1, 1998), pp. 4206-4209.

D. Zeng, W. P. Latham, A. Kar, "Shaping of annular laser intensity profiles and their thermal effects for optical trepanning" *Optical Engineering*, vol. 45, (1), (Jan. 2006) pp. 014301-1/014301-9.

J. Liu, M. Thomson, A Waddie, M. Taghizadeh, "Design of diffractive optical elements for high-power laser applications"*Optical Engineering*, vol. 43 (11), (Nov. 2004), pp. 2541-2548.

Y. Abdelaziez, P. Banerjee, D. Evans, "Beam shaping by use of hybrid acousto-optics with feedback" *Applied Optics*, vol. 44, No. 17, (Jun. 2005), pp. 3473-3481.

K. Sugioka, B. Gu, A. Holmes, "The State of the Art and Future Prospects for Laser Direct-Write for Industrial and Commercial Applications", *MRS Bulletin*, vol. 32, (Jan. 2007), pp. 47-54.

* cited by examiner

*Primary Examiner*—Jordan M. Schwartz
(74) *Attorney, Agent, or Firm*—Brian S. Steinberger; Phyllis K. Wood; Law Offices of Brian S. Steinberger, P.A.

(57) ABSTRACT

Apparatus, systems, methods and devices of an optical system for producing a laser beam having pitchfork profile. The system includes a laser source providing an input Gaussian beam, refractive optical lenses for converting the input Gaussian beam into a super Gaussian beam. A focusing lens focuses the super Gaussian beam, where by diffraction effect after the focusing lens, the beam profile near a focal spot is a pitchfork shaped beam. In an embodiment, the refractive optical lenses are plano-aspheric lenses. The pitchfork shaped beam is produced by passing the input Gaussian beam through plano-aspheric lenses to produce the super Gaussian output beam, and passing the super Gaussian output beam through a focusing lens to produce the output beam having a pitchfork profile. In an embodiment, the pitchfork shaped beam is applied to laser microvias drilling in electronic packaging to produce residue free holes at reduced production cost with simplified procedures.

10 Claims, 3 Drawing Sheets

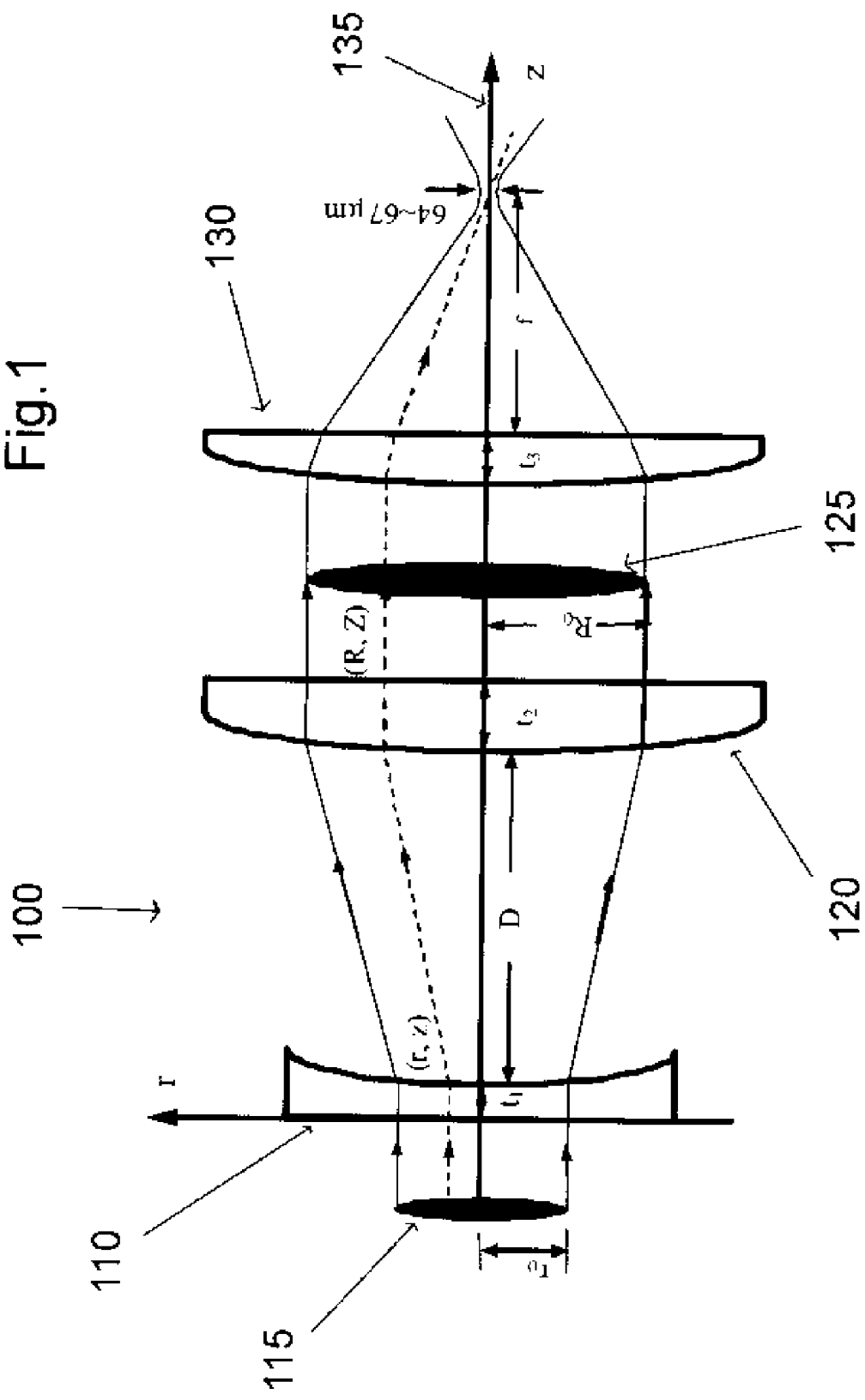

LASER BEAM SHAPING FOR PITCHFORK PROFILE

FIELD OF THE INVENTION

This invention relates to the field of optics and, in particular, to methods, systems, apparatus and devices an optical system for laser shaping to produce an output having a pitchfork profile that can be integrated in the beam delivery system for laser drilling of microvias in electronic packaging, wherein the pitchfork profile refers to the longitudinal cross-section of the laser beam at the focal spot.

BACKGROUND AND PRIOR ART

Typically, the irradiance of the beam coming out from the laser resonator has a Gaussian profile. Laser-beam shaping is the process of redistributing the irradiance and phase of a beam of optical radiation. The irradiance distribution defines the beam profile, such as Gaussian, multimode, annular, rectangular, elliptical, or circular. For different application of laser material processing, different irradiance profile such as flat-top beam, Bessel beam or annular beam is needed.

Known prior art optical systems for laser beam shaping include U.S. Pat. No. 6,295,168 issued to John Allen Hoffnagle and Carl Michael Jefferson on Sep. 25, 2001 teaches a three lens refractive optical system that converts a laser beam to a collimated flat-top beam.

Muhammad Arif, Meer M. Hossain, Ahad S. Awwal and Muhammad N. Islam, Applied Optics, Two-Element Refracting System for Annular Gaussian-to-Bessel Beam Transformation, vol. 37, No. 19, Jul. 1, 1998, pp. 4206-4209 which discloses a refracting system using two lenses to convert an annular Gaussian laser beam into a circular Bessel beam.

D. Zeng, W. P. Latham and A. Kar, Optical Engineering, Shaping of annular laser intensity profiles and their thermal effects for optical trepanning, Vol. 45(1), January 2006, pp. 14301-14301-9 discloses an optical system for transforming a Gaussian laser beam into an annular beam of different intensity profiles. Such profiles include half Gaussian with maximum intensity at the inner or outer radii of the annulus, and full Gaussian with maximum intensity within the annulus.

Jinsong Liu, Martin Thomson, Andrew J. Waddle and Mohammed R. Taghizadeh, Optical Engineering, Design of diffractive optical elements for high-power laser applications, Vol. 43(11), 2004, pp. 2541-2548 teaches a modified iteractive Fourier transform algorithm for designing diffractive optical elements for far-field free-space laser beam shaping.

Yasser A. Abdelaziez, Partha P. Banerjee, and Dean R. Evans, Applied Optics, Beam shaping by use of hybrid acousto-opties with feedback, Vol. 44(17), June 2005, pp. 3473-3481 discloses beam shaping through adaptive feedback in an acoustic-optic device with electrical feedback by using experimentally determined parameters.

Using prior art techniques for laser microvias drilling in electronic packaging, during blind microvias drilling, smear residue is formed along the walls of the hole and at the bottom of the embedded copper pad in multilayer copper-polymer structures for Gaussian beam, flat-top beam or annular beam. To remove the residue, another cleaning process is needed.

What is needed to sole the problem is a pitchfork beam to produce residue free holes, reduce the production cost and simplify the procedures. Preferably, refractive optics are used in the optical system instead of diffractive optics and non-linear optics, because they are easy to manufacture and has low cost.

SUMMARY OF THE INVENTION

A primary objective of the invention is to provide methods, systems, apparatus and devices for an optical system for laser shaping to produce an output beam having a pitchfork profile.

A secondary objective of the invention is to provide methods, systems, apparatus and devices for an optical system for laser shaping that can be integrated in the beam delivery system for laser drilling of microvias in electronic packaging. The vias can be drilled one at a time and/or a set of vias can be drilled simultaneously.

A third objective of the invention is to provide methods, systems, apparatus and devices for producing a pitchfork beam for laser drilling of microvias in electronic packaging that produces residue free holes and reduces the production cost and simplify the procedures.

A fourth objective of the invention is to provide methods, systems, apparatus and devices for using refractive optics in the optical system instead of diffractive optics and non-linear optics because they are easy to manufacture and have a lower cost.

A first preferred embodiment of the invention provides an optical system for producing a laser beam having pitchfork profile. The system includes a laser source for providing an input Gaussian beam, refractive input and output optical lenses for converting the input Gaussian beam into an expanded super Gaussian beam. A focusing lens focuses the expanded super Gaussian beam, where by diffraction effect after the focusing lens, the beam profile near a focal spot is a pitchfork shaped beam. In an embodiment, the refractive optical lenses are plano-aspheric lenses. The input light source could be a $CO_2$ laser having an approximately 9.3 µm wavelength for microvia manufacturing, a Nd:YAG laser having an approximately 1.06 µm wavelength or a frequency-doubled Nd:YAG laser having an approximately 0.532 µm wavelength for higher density packaging which requires vias having less than an approximately 30 µm diameter.

A second preferred embodiment provides a method for shaping a Gaussian beam to produce an output beam having a pitchfork profile includes the steps of providing an input Gaussian beam, passing the input Gaussian beam through a first plano-aspheric lens to produce a first expanded Gaussian beam, passing the first expanded Gaussian beam through a second plano-aspheric lens to produce an expanded super Gaussian output beam, and passing the expanded super Gaussian output beam through a focusing lens to produce the output beam having a pitchfork profile, wherein by diffraction effect after the focusing lens, the beam profile near a focal spot is a pitchfork shaped beam.

In an embodiment, the pitchfork shaped beam is applied to laser microvias drilling in electronic packaging to produce residue free holes at reduced production cost with simplified procedures. In alternative embodiments, the pitchfork shaped beam is applied to drilling a hole having a shape such as triangular, square or hexagonal, wherein the shape of the hole is selected for drilling microvias based on packaging need; applying the pitchfork shaped beam to laser drilling for ceramic and compound semiconductors such as GaN and SiC; and using the ceramic or compound semiconductors for solid state lighting, power electronics and fuel cells.

Further objects and advantages of this invention will be apparent from the following detailed description of preferred embodiments which are illustrated schematically in the accompanying drawings.

BRIEF DESCRIPTION OF THE FIGURES

FIG. 1 shows a three-lens optical system for producing an output pitchfork beam.

DESCRIPTION OF THE PREFERRED EMBODIMENTS

Figure 2C:
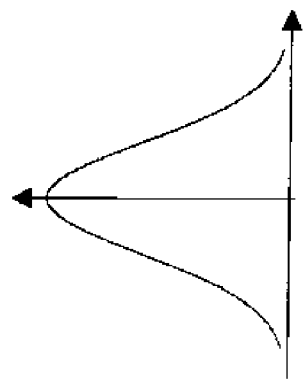
FIG. 2c shows the output pitchfork beam produced by the optical system shown in FIG. 1.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | beam shaping optical system |
| 110 | input Gaussian lens |
| 115 | input Gaussian beam |
| 120 | output Gaussian lens |
| 125 | output Gaussian beam |
| 130 | focusing lens |
| 135 | output pitchfork beam |

It would be useful to discuss the meaning of "pitchfork shaped beam" and "pitchfork profile" as used herein before discussing the invention. Pitchfork shaped beam and pitchfork profile refers to the beam shape or beam profile near the focal spot which has a two-pronged pitchfork shaped beam or profile as shown in FIG. 2c.

The method, system, apparatus and device of the present invention provides an optical system for laser shaping to produce an output beam having pitchfork profile that can be integrated in the beam delivery system for laser drilling of microvias in electronic packaging. The prior art system used for laser microvias drilling in electronic packaging, smear residue can not be avoided. The method, system, apparatus and device of the present invention greatly reduce the volume of the residue thus produce residue-free microvias.

Laser beam shaping is the process of redistributing the irradiance and phase of a beam of optical radiation. To produce residue-free microvias, a pitchfork beam is shaped in this invention. The optical system to convert a Gaussian beam into a pitchfork beam is composed of three lenses. According to a preferred embodiment of the present invention, FIG. 1 shows a three-lens optical system for producing an output pitchfork beam. The optical system includes an input lens 110, and output lens 120 and a focusing lens 130. The input and output lenses 110 and 120 are refractive optics and along with the focusing lens 130, the optical system transforms an input Gaussian laser beam 105 into a Pitchfork beam 135 at the output of the optical system 100. In the embodiment shown in FIG. 1, the refractive optics are plano-aspheric lenses.

Based on the ray tracing techniques in geometrical optics, the first two refractive plano-aspheric arrangements are developed to transform a Gaussian circular laser beam into an expanded super Gaussian beam. As shown in FIG. 1, the ray tracing technique is used to design the first two plano-aspheric lenses 110 and 120 to convert the input Gaussian beam 115 into the expanded super Gaussian beam 125. When the powers of the input and output laser beams are equal, the energy balance is written as follows in polar coordinates for rotationally symmetric systems $$\int_0^{2\pi} \int_0^{r_0} I_i(r) r \, dr \, d\theta = \int_0^{2\pi} \int_0^{R_0} I_{out}(R) R \, dR \, d\theta \tag{1}$$

where $I_i$ and $I_{out}$ are the irradiances of the input Gaussian and output super Gaussian laser beams respectively, $r_0$ is the distance between the point of maximum intensity $I_0$ to the point where the intensity $I_i(r)$ of the input Gaussian laser beam is $I_0/e^2$ and $R_0$ is the radius of the output laser beam. $I_i(r)$ and $I_{out}(R)$ are given by the following expressions:

$$I_i = I_0 \cdot \exp(-2r^2/r_0^2) \tag{2}$$

$$I_{out} = I'_0 \cdot \exp[-2(R/R_0)^{10}] \tag{3}$$

where $$I_0 = \frac{2P}{\pi r_0^2},$$

P is the total laser power, and $I'_0$ is the central intensity of the output laser beam. Substituting Eqs. (2) and (3) into the energy balance equation, the following following expression for $I'_0$ is obtained:

$$I'_0 = I_0 \cdot \frac{1 - \exp(-2)}{\int_0^{R_0} \exp[-2(R/R_0)^2] R \cdot dR} \tag{4}$$

Eq. (1) is an energy balance over the entire laser beam cross-section (i.e., over the radii $r_0$ and $R_0$). Similarly an energy balance equation can be written over two arbitrary radii r and R (as shown in FIG. 1). From Eqs. (1) and (4), the relationship between r and R is found as:

$$r = -\frac{r_0^2}{2} \cdot \ln\left\{1 - \frac{I'_0}{I_0} \cdot \int_0^R \exp\left[-2\left(\frac{R}{R_0}\right)^{10}\right] R \, dR\right\} \tag{5}$$

Based on FIG. 1, the optical path length of the central ray is written as $$nt_1 + n_0 F + nt_2 = F \tag{6}$$

where F is a positive constant, $t_1$ and $t_2$ are thicknesses of the input and output lenses at the respective optical axis, D is the distance between the input and output lenses along their optical axis, and n and $n_0$ are the refractive indices of the lens and the surrounding medium, respectively.

For an arbitrary ray, the optical path length is $$nz + n_0\sqrt{(R-r)^2 + (Z-z)^2} + n(t_1 + t_2 + D - Z) \quad (7)$$

which is written as follows since the optical path length is the same for all the rays, $$n_0\sqrt{(R-r)^2 + (Z-z)^2} = n(Z-z) - D(n - n_0) \quad (8)$$

Letting $\gamma = n_0/n$ and $F' = (\gamma - 1)D$, Eq. (7) yields the following relationship between Z and z $$Z - z = \frac{-F' + \sqrt{F'^2 - (1 - \gamma^2)[F'^2 - \gamma^2(R-r)^2]}}{1 - \gamma^2} \quad (9)$$

Considering the input and output rays as parallel to the optical axis, $$\frac{dz}{dr} = \frac{dZ}{dR} = \tan\theta_{11} = \tan\theta_{22} \quad (10)$$

$$\tan(\theta_{11} - \theta_{12}) = \tan(\theta_{21} - \theta_{22}) = (R-r)/(Z-z) \quad (11)$$

Combining Eqs. (8), (9) and (10) with Snell's law, the slopes of the input and output lens surfaces are determined using the following expression:

$$\frac{dz}{dr} = \frac{dZ}{dR} = \frac{(R-r)\gamma}{\{F'^2 - (R-r)^2\gamma^2 + (R-r)^2\}} \quad (12)$$

For the input Gaussian beam, the incident laser irradiance is $I_i = I_0 \cdot \exp(-2r^2/r_0^2)$, where $r_0 = 0.2$ cm is the radius of incident laser beam. $I_0$ is the laser irradiance at the center of the beam. For the output super Gaussian beam, the laser irradicance is $I_{out} = I'_0 \cdot \exp(-2(R/R_0)^{10})$. The radius of output laser beam $R_0 = 2$ cm.

In this example, the distance between the two lenses $D = 5$ cm.

The input Gaussian lens 110 surface is:

$$z = \frac{4.091 \cdot r^2}{1 + \sqrt{1 - (1 - 2.492) \cdot 4.091^2 \cdot r^2}} - 1.158 \cdot r^2 + 3.242 \cdot r^4 \quad (13)$$

The variables r and z also have the unit of cm.

The output Gaussian lens 120 surface is:

$$Z = 0.070 \cdot R^2 + 0.019 \cdot R^4 \quad (14)$$

The variable r and z used here have the unit of cm.

Previously, based on geometrical optics, two refractive arrangements have been developed that transform a Gaussian circular laser beam into a super Gaussian beam. Geometric optics, or ray optics, describe light propagation in terms of rays which fails to account for many important optical effects such as diffraction and polarization. Then light propagation is based on the scalar diffraction theory, the diffractive effect of lenses system is studied.

After the super Gaussian beam is obtained from the previous beam shaping system, Fresnel diffraction is applied to calculate the propagation of the super Gaussian beam through the focusing lens. For the focusing lens, a plano-aspheric lens corrected for spherical aberration can be used with f=5.08 cm (focusing lens 130).

The output super Gaussian electric field illuminates the surface of the focusing lens. The amplitude of the super Gaussian electric field, $U_0$, is written as follows:

$$U_0(x, y) = A\exp\left[-\left(\frac{x^2 + y^2}{R_0^2}\right)^5\right] \quad (15)$$

Figure 3:
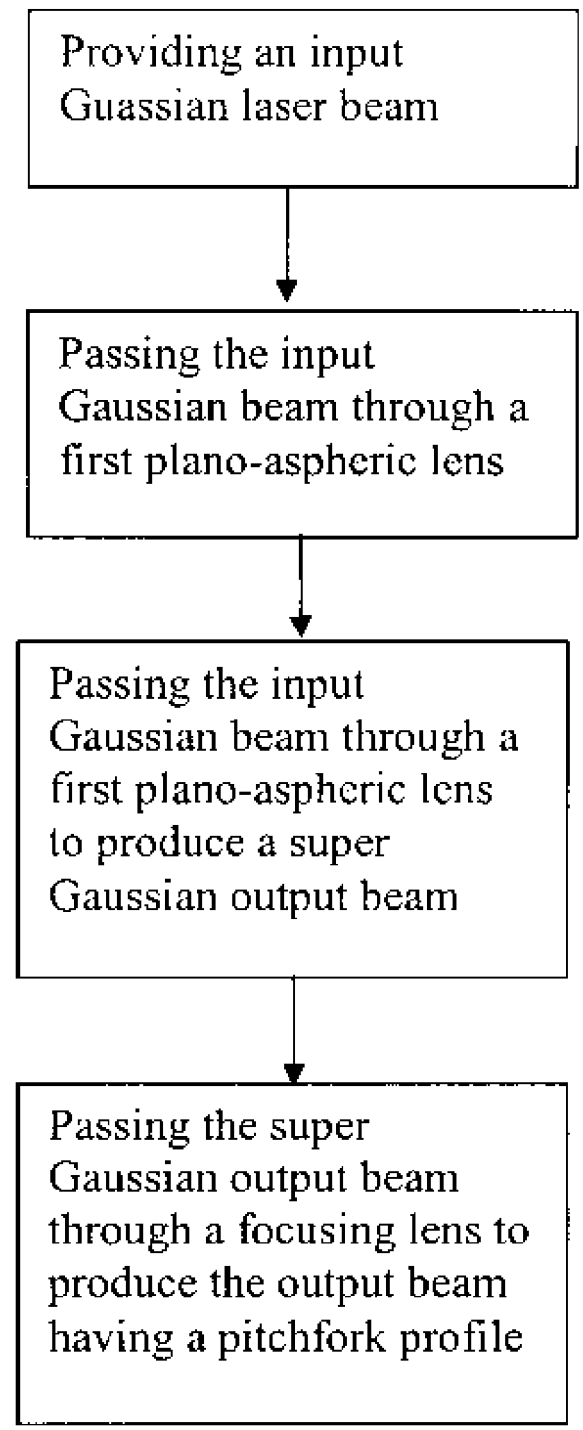
FIG. 3 is a flow diagram showing the steps for converting an input Gaussian beam to an output beam having a pitchfork profile.

As a ray travels to the focusing lens 130 in FIG. 3, the optical phase delay $\phi(x,y)$ introduced by the focusing lens and the air is $$\phi(x, y) = knt_3 - kn_0\frac{x^2 + y^2}{2f}. \quad (16)$$

where $t_3$ is the thickness of the focusing lens along its optical axis and f is the focal length of the focusing lens.

Then the transmittance function t(x,y) of the focusing lens is $$t(x, y) = \begin{cases} \exp(i\phi_3(x, y)) & \text{for } x^2 + y^2 < \rho_1^2 \\ 0 & \text{for } x^2 + y^2 \geq \rho_1^2 \end{cases}. \quad (17)$$

Neglecting the constant phase factor $\exp(iknt_3)$, the diffraction field $U(\alpha, \beta, L)$ at a distance L from the focusing lens along the optical axis can be written as follows by the Fresnel diffraction integral $$U(\alpha, \beta, L) = \frac{k\exp(ikL)}{iL}\int\int_A U_0(x, y)\exp\left\{\frac{ik[(x-\alpha)^2 + (y-\beta)^2]}{2L}\right\}\exp\left(\frac{-ik(x^2+y^2)}{2f}\right)dA \quad (18)$$

The integral is regarded as a Fourier transform at frequencies ($f_x = \alpha k/2\pi L$, $f_y = \beta k/2\pi L$) which is calculated numerical by two dimensional fast Fourier transform, which is written as:

$$U(\alpha, \beta, L) = \frac{k\exp(ikL)}{iL} \cdot \exp\left[\frac{ik(\alpha^2 + \beta^2)}{2L}\right]. \quad (19)$$

$$FFT2\left[U_0(x, y)\exp\left\{\frac{ik(x^2+y^2)}{2L}\right\}\exp\left(\frac{-ik(x^2+y^2)}{2f}\right)\right]$$

When L is approximately equal to f (L≈1.002 f), the output beam has the pitchfork profile.

Figure 2B:
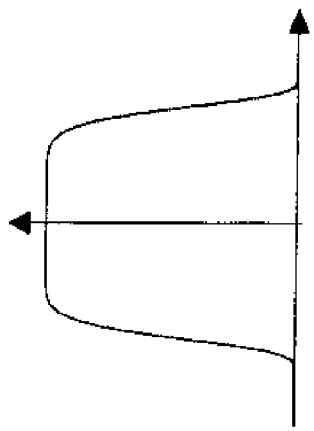
FIG. 2b shows the output expanded super Gaussian beam at the output of the second lens of the optical system shown in FIG. 1.
Figure 2A:
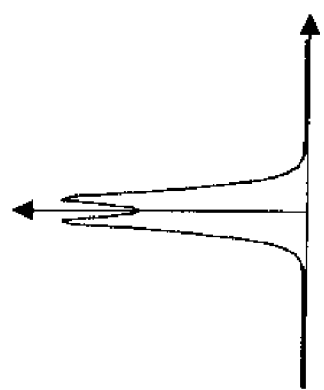
FIG. 2a shows the input Gaussian beam of the optical system shown in FIG. 1.

FIG. 2*a* shows the input Gaussian beam 105 at the input of the optical system shown in FIG. 1. The input and output plano-aspheric lenses 110 and 120 produce the output expanded super Gaussian beam 125 shown in FIG. 2b. The focusing lens 130 shapes the super Gaussian beam 125 into the output pitchfork beam shown in FIG. 2c.

FIG. 3 is a flow diagram showing the steps for converting an input Gaussian beam to an output beam having a pitchfork profile. As shown, in the first step a lasing device provides an input Gaussian beam. In the second and third steps, the input Gaussian beam is passed through at least two refractive lenses to produce a first expanded Gaussian beam. The super Gaussian beam is passed through a focusing lens to produce the output beam having a pitchfork profile.

The devices, systems, method and apparatus of the present invention can be applied to the laser microvias drilling in electronic packaging. During blind microvias drilling, smear residue is formed along the walls of the hole and at the bottom of the embedded copper pad in multilayer copper-polymer structures for Gaussian beam, flat-top beam or annular beam. To remove the residue, another cleaning process is required.

The pitchfork beam produced using the system shown in FIG. 1 produces residue free holes and will reduce the production cost and simplify the procedures. Refractive optics is used in the optical system instead of diffractive optics and non-linear optics, because it is easy to manufacture and has low cost.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical system for producing a laser beam having a two prong pitchfork profile comprising:

a lasing device for providing an input Gaussian beam;

an input and an output Gaussian lens for converting the input Gaussian beam into an expanded super Gaussian beam, the input Gaussian lens having a lens surface defined by the condition $$z = \frac{4.091 \cdot r^2}{1 + \sqrt{1 - (1 - 2.492) \cdot 4.091^2 \cdot r^2}} - 1.158 \cdot r^2 + 3.242 \cdot r^4$$

and the output Gaussian lens having a lens surface defined by the condition $Z = 0.070 \cdot R^2 + 0.019 \cdot R^4$ where r and R are two arbitrary radii in which the relationship between r and R is defined by $$r = -\frac{r_0^2}{2} \cdot \ln\left\{1 - \frac{I_0'}{I_0} \cdot \int_0^R \exp\left[-2\left(\frac{R}{R_0}\right)^{10}\right] R\,dR\right\};$$

a focusing lens for focusing the expanded super Gaussian beam, wherein by diffraction effect after the focusing lens, the beam profile near a focal spot is a two prong pitchfork shaped beam, the two prong pitchfork profile refers to the longitudinal cross-section of the laser beam at the focal spot.

2. The system of claim 1, wherein the focusing lens comprises:

a plano-aspheric focusing lens corrected for spherical aberration.

3. The system of claim 1, further comprising:

a laser microvias drilling apparatus incorporating the optical system for producing a laser beam having the two-prong pitchfork profile.

4. The system of claim 1, wherein the lasing device comprises:

a $CO_2$ laser having an approximately 9.3 μm wavelength for microvia manufacturing.

5. The system of claim 1, wherein the lasing device comprises:

a Nd:YAG laser having an approximately 1.06 μm wavelength.

6. The system of claim 3, wherein the lasing device comprises:

a frequency-doubled Nd:YAG laser having an approximately 0.532 μm wavelength for higher density packaging which requires vias having less than an approximately 30 μm diameter.

7. A method for shaping a light beam comprising the steps of:

providing an input Gaussian beam; and passing the input beam through a refractive optics system to shape the input beam using light propagation based on a diffractive effect in the lens system, the refractive optics system consisting essentially of the steps of:

shaping the input beam into an expanded super Gaussian beam by an input refractive optical lens and an output refractive optical lens; and focusing the expanded super Gaussian beam with a focusing lens to shape the expanded super Gaussian beam to an output beam having a longitudinal cross-section of a two-pronged pitchfork shaped beam.

8. The system of claim 7, wherein each of the input and output refractive optical lens comprises:

a plano-aspheric lens.

9. The system of claim 7, wherein the focusing lens comprises:

a plano-aspheric focusing lens corrected for spherical aberration.

10. The system of claim 7, wherein each of the input and output refractive optical lenses are Gaussian lenses.

\* \* \* \* \*